United States Patent [19]
Lee et al.

[11] Patent Number: 6,091,340
[45] Date of Patent: Jul. 18, 2000

[54] REMOTE ON/OFF DISABLE PARTS AND SYSTEM

[76] Inventors: Brian Lee, 1864 Skyline Dr., Honolulu, Hi. 96817; John Paoa, 842C 20th Ave., Honolulu, Hi. 96816

[21] Appl. No.: 08/978,254

[22] Filed: Nov. 25, 1997

[51] Int. Cl.[7] .................................................. G06F 7/04
[52] U.S. Cl. .............................. 340/825.31; 340/825.34
[58] Field of Search .................... 340/825.31, 825.69, 340/825.72, 426; 341/176; 307/10.1, 10.2, 10.3, 10.6; 123/179.2; 180/287

[56] References Cited

U.S. PATENT DOCUMENTS

| | | |
|---|---|---|
| 4,345,554 | 8/1982 | Hildreth et al. . |
| 5,024,186 | 6/1991 | Long et al. . |
| 5,184,584 | 2/1993 | Cantrell . |
| 5,276,728 | 1/1994 | Pagliaroli et al. ...................... 307/10.5 |
| 5,453,730 | 9/1995 | De-Grinis et al. ...................... 340/426 |
| 5,623,245 | 4/1997 | Gilmore .................................. 340/426 |
| 5,641,999 | 6/1997 | Kawashima . |
| 5,680,134 | 10/1997 | Tsui .................................... 340/825.31 |
| 5,729,192 | 3/1998 | Badger .................................... 340/426 |
| 5,835,868 | 11/1998 | McElroy et al. ......................... 340/426 |

*Primary Examiner*—Michael Tokar
*Assistant Examiner*—Jean B. Jeanglaude
*Attorney, Agent, or Firm*—Michael I. Kroll

[57] ABSTRACT

A remote control vehicle disable system attached to a power source for remotely preventing and allowing starting of a vehicle. The remote control vehicle disable system includes a remote control unit and a control unit positioned within the vehicle for receiving wirelessly transmitted control signals from the remote control unit. The remote control unit includes a key for generating a control signal and a transmitter for transmitting the control signal upon activation of the at least one key at least one of a plurality of predetermined frequencies to the control unit. The control unit includes a receiver tuned to receive signals at a particular predetermined frequency for receiving the transmitted control signal and a switch integrally connected with a predetermined part of the vehicle and operable between a first closed position connecting the predetermined part to its respective system thereby permitting the vehicle to start and a second open position disconnecting the predetermined part from its respective system thereby preventing the vehicle from starting. The control unit is integrally connected to the predetermined part which may be any one or all of the ignition coil, engine starter, throttle position sensor, electrical control module and fuel pump.

2 Claims, 6 Drawing Sheets

| FIG 5A |
|--------|
| FIG 5B |

FIG 5

S2 — INSTALL ANY OR ALL OF ENGINE STARTER, IGNITION COIL, FUEL PUMP AND THROTTLE SENSOR OF PRESENT INVENTION IN VEHICLE

S4 — TURN TRANSMISSION FREQUENCY CHANNEL SELECTION DIAL TO TUNE REMOTE TRANSMITTER TO DESIRED CHANNEL FREQUENCY

S6 — ACTIVATE DISABLE SYSTEM TO CLOSE SWITCHES OF INSTALLED SYSTEMS ALLOWING VEHICLE TO START BY PRESSING DISABLE SYSTEM KEY AND TRANSMITTING SIGNAL TO INDIVIDUAL UNITS AT SELECTED FREQUENCY

S8 — GET IN VEHICLE AND TRAVEL TO DESTINATION

FIG 5A

S10 — ACTIVATE DISABLE SYSTEM KEY TO GENERATE CUT OFF SIGNAL AND TRANSMIT CUT OFF SIGNAL FROM REMOTE CONTROL TO RECEIVER OF EACH INSTALLED SYSTEM UPON LEAVING VEHICLE OR UPON REALIZING THE VEHICLE IS BEING STOLEN TO OPEN SWITCH THEREBY DISCONNECTING INSTALLED SYSTEMS AND PREVENT STARTING OF VEHICLE

S12 — DEACTIVATE WHEN IT IS DESIRED TO USE VEHICLE BY EITHER PRESSING THE DISABLE SYSTEM KEY OR TRANSMITTING WIRELESS SIGNAL VIA TELEPHONE CAUSING SWITCHES CONNECTED TO RECEIVERS TUNED TO SELECTED FREQUENCY TO CLOSE

FIG 5B

REMOTE ON/OFF DISABLE PARTS AND SYSTEM

BACKGROUND OF THE INVENTION

1. Field of the Invention

The present invention relates generally to vehicle security systems and, more specifically, to individual parts and a system for remotely disconnecting and disabling any or all of a plurality of systems of a vehicle to prevent starting of the vehicle.

2. Description of the Prior Art

Numerous vehicle security systems have been provided in the prior art. For example, U.S. Pat. Nos. 4,345,554; 5,024, 186; 5,184584; and 5,641,999 all are illustrative of such prior art. While these units may be suitable for the particular purpose to which they address, they would not be as suitable for the purposes of the present invention as heretofore described.

A remotely controlled engine starter and protective system, particularly for engine driven vehicles, in which a remotely located radio transmitter is utilized to initiate energization of the starter motor; a first timer opens the starter circuit if the engine does not start in approximately ten seconds, and if the engine starts, a second timer is operative to stop the engine after approximately ten minutes. Protective features are also provided to cut off power to the starter motor and ignition system in the event that the engine speed reaches a preset overspeed level; the vehicle is physically moved in a forward or reverse direction; automatically initiate starting of the engine when the ambient temperature falls below a preset level; cut off the system and prevent restarting for a period of 5 seconds, when the engine RPM is less than a preset level for a period of one second; cut off power to the starter motor when a preset running RPM of the engine is obtained; and delay energization of accessories for a period of 30 seconds after a starting operation is successfully initiated.

This invention pertains to features which are to be incorporated into remote automobile starter units. These features include a diagnostic system to aid in the installation of a remote automobile starter unit. Another aspect is a security feature which ensures that a vehicle is not driven away by an unauthorized driver after it has been remotely started. Another aspect is a feature which prevents a remote automobile starter unit from being functionally placed in automobiles with manual transmissions.

An electrical system for bypassing the anti-theft system of a vehicle such that the engine can be started with a remote control. In particular, this is a system which allows the operator of a vehicle to start the vehicle from a remote location without having the key in the ignition and without alarming the vehicle's anti-theft device. Activation of the remote control which throws a switch, bypasses the normal key dependent ignition circuitry. A potentiometer in the bypass loop mimics the resistance pellet embedded in the ignition key, which is normally required for engaging the engine without alarming the anti-theft device. Other portions of an anti-theft system can also be bypassed if desired.

A vehicle ignition key device directly activates a rotary switch by a rotation-driving mechanism remotely driven by an external control signal for stopping the engine of the vehicle. The device is further useful as a burglar-proof device. A rotary switch can be placed in OFF, ON and START positions by key operation, and a rotation-driving mechanism activates the switch in each of the positions by receiving an externally dispatched signal. Further, this device is constructed for use as the burglar-proof device by being provided with a vehicle speed detector and a mode switch for burglar-proofing.

SUMMARY OF THE PRESENT INVENTION

The present invention relates generally to vehicle security systems and, more specifically, to individual parts and a system for remotely disconnecting and disabling any or all of a plurality of systems of a vehicle to prevent starting of the vehicle.

A primary object of the present invention is to provide a remote control vehicle disable system that will overcome the shortcomings of prior art devices.

Another object of the present invention is to provide remote control vehicle disable system which is able to prevent a vehicle from starting upon receipt of a control signal generated by a remote control unit.

An additional object of the present invention is to provide remote control vehicle disable system including a receiver and switch combination connected to and integral with any or all of the ignition coil, engine starter, fuel pump, throttle position sensor and electronics control module for remotely disabling the respective system to prevent a vehicle from starting.

A still further object of the present invention is to provide a remote control vehicle disable system that is able to be included in any of numerous different types of vehicles such as a truck, van, bus, motorcycle, moped, boat, airplane, etc.

An even further object of the present invention is to provide a remote control vehicle disable system including a remote control unit able to transmit signals to the installed parts at any of a plurality of user selected frequencies.

Another object of the present invention is to provide a remote control vehicle disable system that is simple and easy to use.

A still further object of the present invention is to provide a remote control vehicle disable system that is economical in cost to manufacture.

Additional objects of the present invention will appear as the description proceeds.

A remote control vehicle disable system attached to a power source for remotely preventing and allowing starting of a vehicle is described by the present invention. The remote control vehicle disable system includes a remote control unit and a control unit positioned within the vehicle for receiving wirelessly transmitted control signals from the remote control unit. The remote control unit includes a key for generating a control signal and a transmitter for transmitting the control signal upon activation of the at least one key at least one of a plurality of predetermined frequencies to the control unit. The control unit includes a receiver tuned to receive signals at a particular predetermined frequency for receiving the transmitted control signal and a switch integrally connected with a predetermined part of the vehicle and operable between a first closed position connecting the predetermined part to its respective system thereby permitting the vehicle to start and a second open position disconnecting the predetermined part from its respective system thereby preventing the vehicle from starting. The control unit is integrally connected to the predetermined part which may be any one or all of the ignition coil, engine starter, throttle position sensor, electrical control module and fuel pump.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 5 is a flow diagram describing the use of the remote control vehicle disable system of the present invention.

DESCRIPTION OF THE REFERENCED NUMERALS

Figure 1:
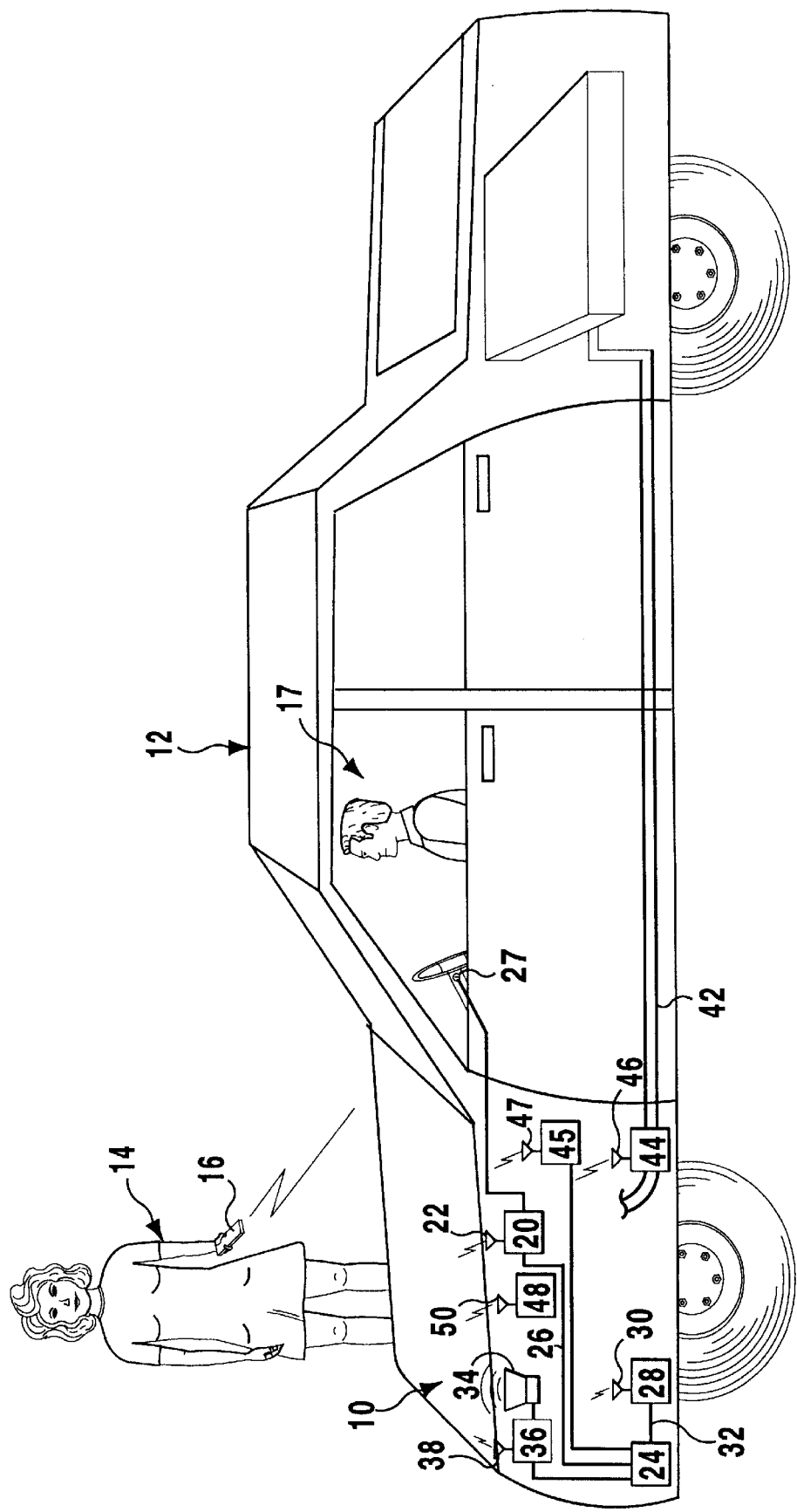
FIG. 1 is a perspective side view of a thief within and attempting to start a car equipped with the remote control vehicle disable system of the present invention.

Turning now descriptively to the drawings, in which similar reference characters denote similar elements throughout the several views, the Figures illustrate the remote control vehicle disable system of the present invention. With regard to the reference numerals used, the following numbering is used throughout the various drawing figures.

10 remote control vehicle disable system of the present invention
12 vehicle equipped with the remote control vehicle disable system of the present invention
14 owner of vehicle equipped with the remote control vehicle disable system of the present invention
16 remote control unit
17 thief within vehicle
18 vehicle ignition
20 ignition coil
22 receiver antenna connected to ignition coil
24 power source
26 connection wire between power source and ignition coil
27 ignition of vehicle
28 engine starter
30 receiver antenna connected to engine starter
32 connection wire between power source and engine starter
42 fuel line
44 fuel pump
45 electronic control module
46 antenna connected to fuel pump
47 antenna connected to electronic control module
48 throttle position sensor
49 switch for electronic control module
50 antenna connected to throttle position sensor
60 switch connected to ignition coil
62 wireless receiver connected to ignition coil
64 switch connected to starter
66 wireless receiver connected to starter
68 throttle
70 switch connected to throttle position sensor
72 wireless receiver connected to throttle position sensor
76 switch connected to fuel pump
78 wireless receiver connected to fuel pump
100 antenna for remote control unit
102 disable system key
104 transmission frequency channel selection dial

DETAILED DESCRIPTION OF THE PREFERRED EMBODIMENT

Turning now descriptively to the drawings, in which similar reference characters denote similar elements throughout the several views, FIGS. 1 through 4 illustrate the remote control vehicle disable parts and system indicated generally by the numeral 10.

Figure 2:
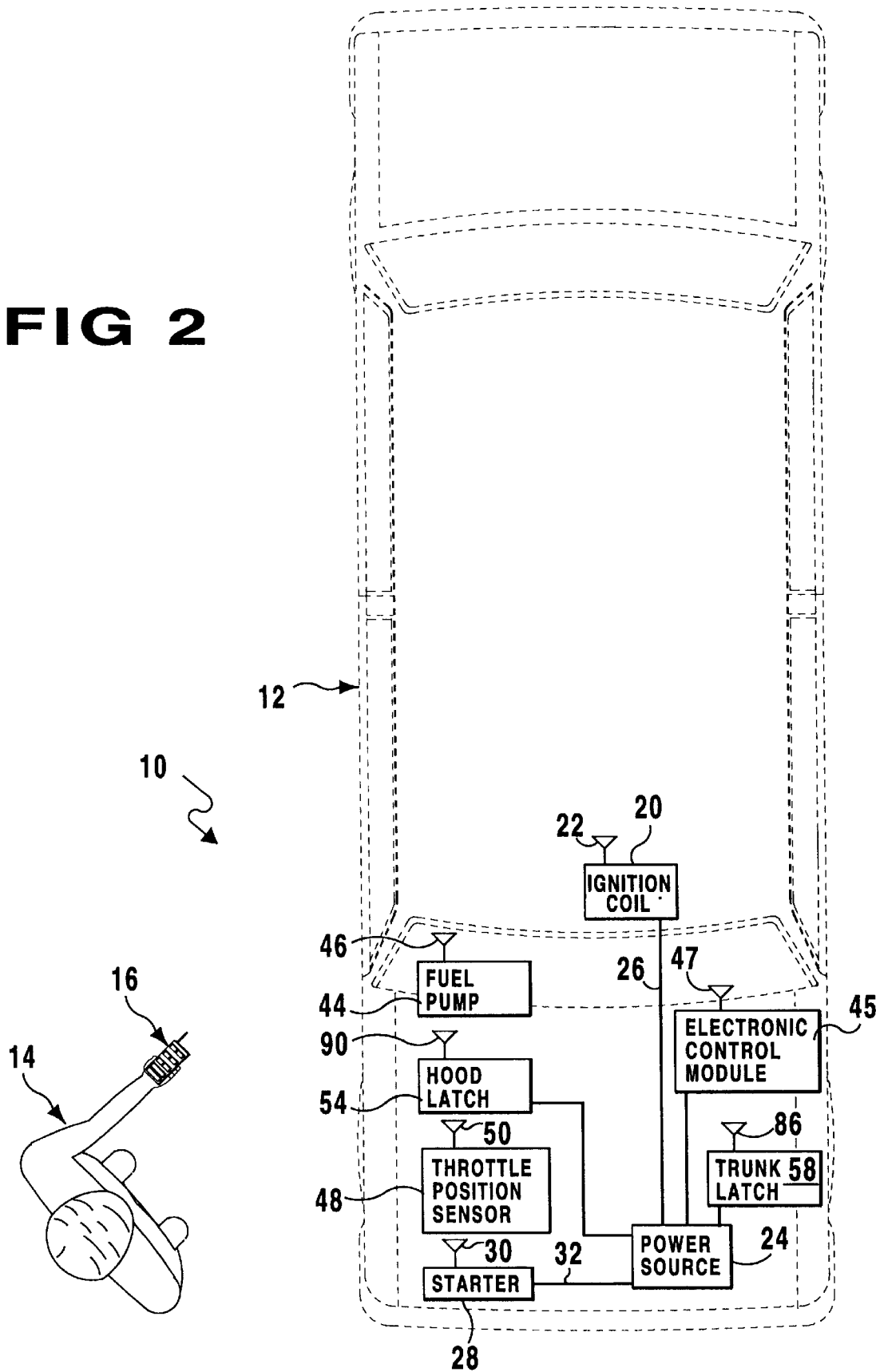
FIG. 2 is a perspective top view illustrating a vehicle in dashed lines equipped with the remote control vehicle disable system of the present invention.

The remote control vehicle disable system 10 is installed within a vehicle 12 such as an automobile as illustrated in FIGS. 1 and 2 and a remote control unit 16 is retained by the user 14 of the vehicle 12. The installation of the remote control vehicle disable system 10 in an automobile is for purposes of example only as the remote control vehicle disable system 10 can be installed in and utilized by any vehicle such as a truck, van, bus, motorcycle, moped, boat, airplane, etc. and the applicable features modified to fit the vehicle in which it is installed. Certain features and parts within the remote control vehicle disable system 10 may not be applicable for all types of vehicles. Thus, the system can be separated into individual parts wherein all features of this system will not be included in all types of vehicles. The owner or user 14 of the vehicle 12 will be equipped with the remote control unit 16 for activating the remote control vehicle disable system 10. As is illustrated in FIG. 1, the remote control vehicle disable system 10 can be used to prevent theft of the vehicle 12 and assist in apprehending a thief 17 by preventing the vehicle 12 from starting when not in use or disconnecting the battery from various parts of the vehicles engine upon transmission and receipt of a signal from a remote control unit 16 or a telephone.

Figure 3:
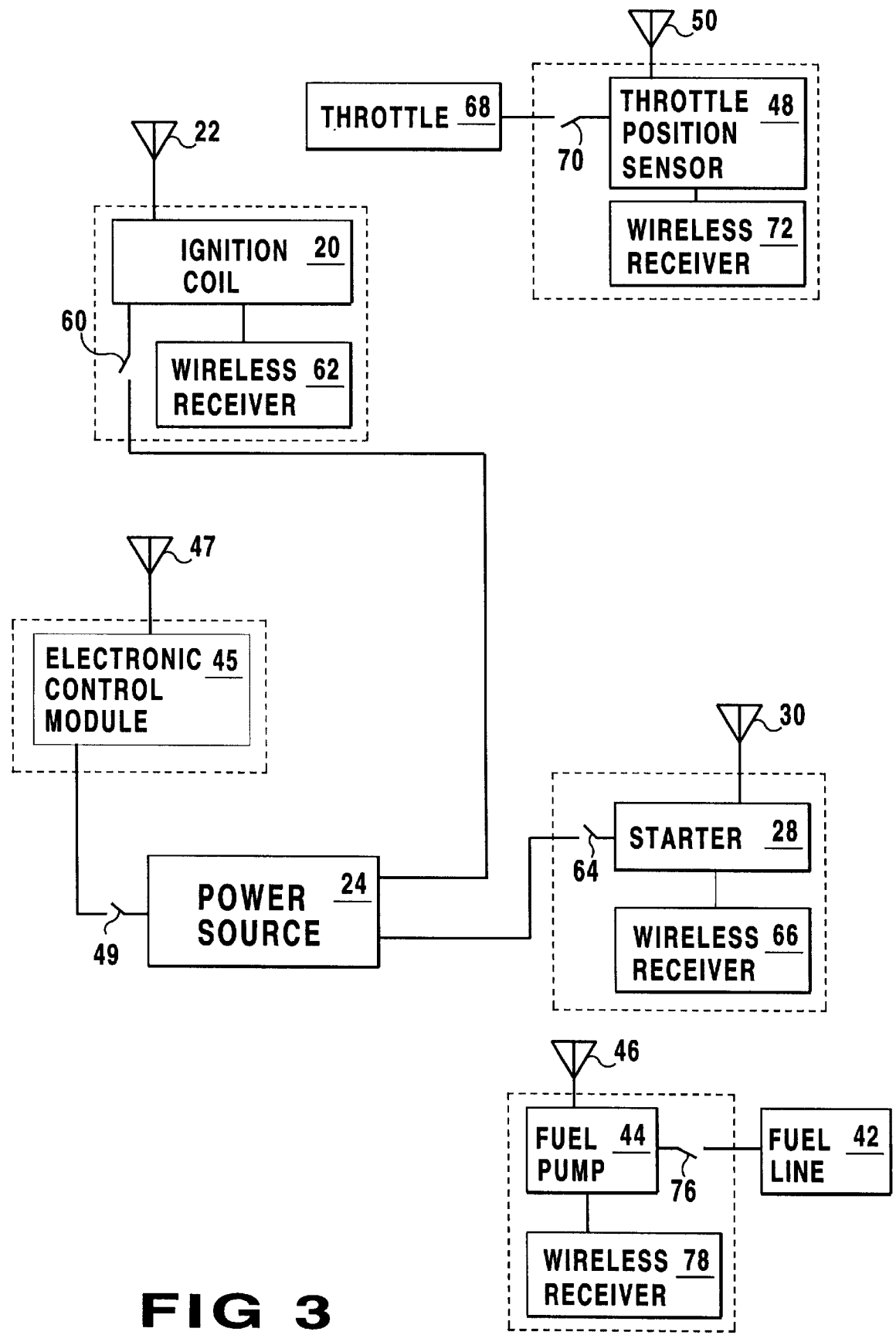
FIG. 3 is a schematic block drawing of the remote control vehicle disable system of the present invention.

The remote control vehicle disable system 10 is activated upon receipt of a control signal transmitted from the remote control unit 16 or a telephone to one or more receiver and switch combinations installed within operating parts of the vehicle 12. One such operating part is the ignition coil 20 of the vehicle 12 which is connected between a power source 24, i.e. the vehicle battery, and the vehicle ignition 27 via a connection wire 26. Connected to and integral with the ignition coil 20 is a receiver and receiver antenna combination 22. The receiver and receiver antenna combination 22 is tuned to receive control signals from the remote control 16 transmitted at a predetermined frequency and upon receipt of the control signal will activate a switch 60, as is illustrated in FIG. 3, for disabling the vehicle ignition 27 by opening the switch 60 and disconnecting the vehicle ignition 27 from the battery 24. This prevents the vehicle ignition 27 from starting the vehicle 12 upon inserting a key therein and turning as the ignition 27 is disconnected from the vehicle battery 24.

The engine starter 28 of the vehicle 12 is also connected to the vehicle battery 24 via a connection wire 32. Connected to and integral with the engine starter 28 is a receiver and receiver antenna combination 30. The receiver and receiver antenna combination 30 is tuned to receive control signals either at the same frequency as the receiver and receiver antenna 22 or at a different frequency from that of the receiver and receiver antenna 22 connected to the ignition coil 20 from the remote control 16. As will be discussed hereinafter, the remote control 16 may be tuned to transmit the control signal on any of a plurality of transmission channels each associated with a particular transmission frequency. Upon receipt of the control signal, the receiver and receiver antenna combination 30 will activate a switch 64, as is illustrated in FIG. 3, for disabling the engine starter 28 by opening the switch 64 to thereby disconnect the vehicle battery 24 from the engine starter 28. This will prevent the engine starter 28 from starting the vehicle 12 as the engine starter 28 is disconnected from the vehicle battery 24.

The fuel pump 44 is connected to the fuel line 42 of the vehicle 12. Connected to and integral with the fuel pump 44 is a receiver and receiver antenna combination 46. The receiver and receiver antenna combination 46 is tuned to receive control signals at the same frequency as the receiver and receiver antenna 22 or at a different frequency from that of the receiver and receiver antenna 22 connected to the ignition coil 20 from the remote control 16. Upon receipt of the control signal the receiver and receiver antenna combination 46 will activate a switch 76, as illustrated in FIG. 3, for disconnecting the fuel line 42 from the engine of the vehicle 18 thus preventing fuel from being transported to and through the vehicle engine preventing the vehicle 12 from starting and running as the fuel line 42 is disconnected from the engine of the vehicle 12 and thus cannot supply fuel thereto.

The electronic control module 45 of the vehicle 12 is connected between the vehicle battery and the electronic control module 45 of the vehicle 12, controlling the electronic systems of the vehicle 12. Connected to and integral with the electronic control module 45 is a receiver and receiver antenna combination 47. The receiver and receiver antenna combination 47 is also tuned to receive control signals at the same frequency as the receiver and receiver antenna combination 22 or at a different frequency from that of the receiver and receiver antenna 22 connected to the ignition coil 20 from the remote control 16 and upon receipt of the control signal will activate a switch 49, as illustrated in FIG. 3, for disabling the electrically operated devices of the vehicle 12 from the vehicle battery 24 by opening the switch 49 disconnecting the power source 24 from the electronic control module 45 thus preventing the electrically operated devices from working as the electronic control module 45 is disconnected from the vehicle battery 24.

A throttle position sensor 48 for the vehicle 12 is connected to sense the position of the vehicle throttle. Connected to and integral with the throttle position sensor 48 is a receiver and receiver antenna combination 50 tuned to receive control signals from the remote control 16. The receiver and receiver antenna combination 50 is tuned to receive control signals from the remote control 16 at the same frequency as the receiver 22 or at a different frequency from that of the receiver and receiver antenna 22 connected to the ignition coil 20. Upon receipt of the control signal the receiver and receiver antenna combination 50 will activate a switch 70, as illustrated in FIG. 3, for disconnecting the throttle from the engine and preventing the vehicle 12 from operating as the throttle 68 is disconnected from the engine of the vehicle 12.

A schematic block diagram of the remote control vehicle disable parts and system 10 installed within the vehicle 12 is shown in FIG. 3. As is clearly shown in this figure the remote control vehicle disable system 10 includes a power source 24, i.e. the vehicle battery, connected to numerous engine and vehicle elements. The power source 24 is connected to the ignition 27 via the ignition coil 20. Integral with the ignition coil 20 and coupled between the ignition coil 20 and the vehicle battery 24 is the switch 60. Also integral with and connected to the ignition coil 20 is the receiver and receiver antenna combination 22. The receiver and receiver antenna combination 22 receives control signals transmitted by the remote control unit 16 and acts to open and close the switch 60. When the receiver and receiver antenna combination 22 receives a signal from the remote control unit 16 indicating that the vehicle 12 should be prevented from starting it controls the switch 60 causing it to open thus disconnecting the vehicle ignition 27 from the power source 24 thereby preventing the vehicle 12 from starting until the switch 60 is closed. A wireless receiver 62 is also connected to the ignition coil 20 and is able to receive wireless communications from a conventional telephone or transmitter. The wireless receiver 66 acts to open and close the switch 64 upon receipt of a wireless transmission signal.

The power source 24 is also connected to the starter 28 of the vehicle 12. Integral with the starter 28 and coupled between the starter 28 and the vehicle battery 24 is the switch 64. Also integral with and connected to the ignition coil 20 is the receiver and receiver antenna combination 30. The receiver and receiver antenna combination 30 receives control signals transmitted by the remote control unit 16 and acts to open and close the switch 64. A wireless receiver 66 is also connected to the starter 44 and is able to receive wireless communications from a conventional telephone or transmitter. The wireless receiver 66 acts to open and close the switch 64 upon receipt of a wireless transmission signal.

Integral with the throttle position sensor 48 and coupled between the throttle position sensor 48 and the throttle 68 is the switch 70. Also integral with and connected to the throttle position sensor 48 is the receiver and receiver antenna combination 50. The receiver and receiver antenna combination 50 receives control signals transmitted by the remote control unit 16 and acts to open and close the switch 70 to thereby allow and prevent operation of the throttle 68 thereby preventing the vehicle 12 from starting. A wireless receiver 72 is also connected to the throttle position sensor 48 and is able to receive wireless communications from a conventional telephone or transmitter. The wireless receiver 72 acts to open and close the switch 70 upon receipt of a wireless transmission signal.

Integral with the fuel pump 44 and coupled between the fuel pump 44 and the fuel line 42 is the switch 76. Also integral with and connected to the fuel pump 44 is the receiver and receiver antenna combination 46. The receiver and receiver antenna combination 46 receives control signals transmitted by the remote control unit 16 and acts to open and close the switch 76 to thereby allow and prevent fuel from flowing through the fuel line 42. A wireless receiver 78 is also connected to the fuel pump 44 and is able to receive wireless communications from a conventional telephone or transmitter. The wireless receiver 78 acts to open and close the switch 76 upon receipt of a wireless transmission signal.

Figure 4:
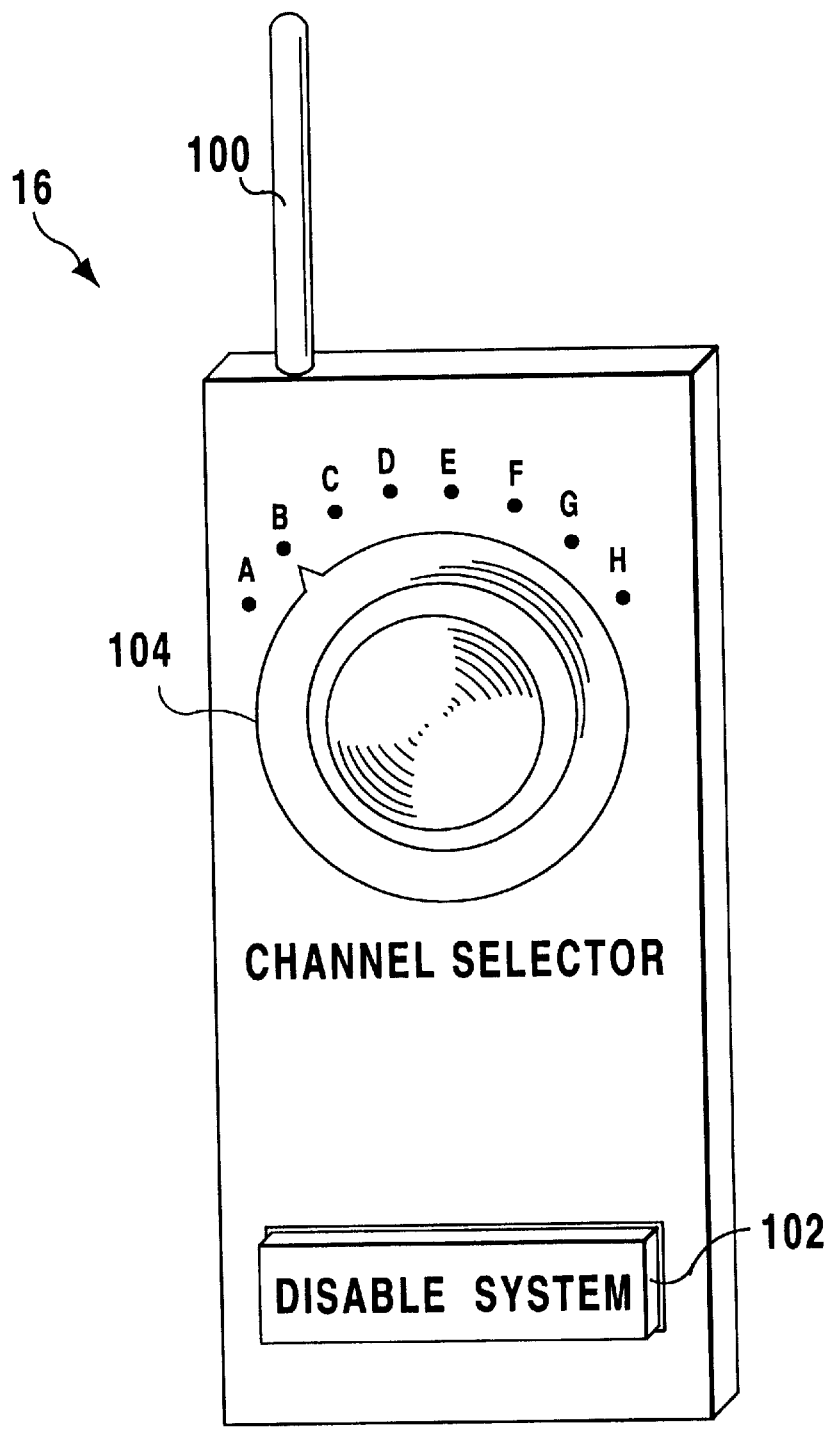
FIG. 4 is a top perspective view of a remote control unit for use with the remote control vehicle disable system of the present invention.

FIG. 4 illustrates the remote control unit 16. The remote control unit 16 includes an antenna 100 for transmitting signals to the corresponding units within the remote control vehicle disable system 10 installed in a vehicle 12. The remote control unit 16 includes at least one key 102 and a transmission channel frequency selection dial 104. When the at least one key is pressed or activated a control signal is transmitted at the frequency set by the transmission channel frequency selection dial 104 to the respective units within the remote control vehicle disable system 10 for opening or closing the respective switches of the units having a receiver tuned to the selected channel frequency. The control signal is transmitted at a frequency selected by the user through the transmission channel frequency selection dial 104 to which the receiver and receiver antenna combination of any or all individual parts, e.g. ignition coil 20, starter 28, throttle position sensor 48, fuel pump 44 and electrical control module 45, are tuned. The signal will act to open or close the respective switch of each part and thus allow or prevent the vehicle 12 from starting. Activation of the switches may also be controlled through the wireless receiver able to receive wirelessly transmitted signals from either a telephone or wireless transmitter tuned to the correct frequency.

The operation of the device will now be described with reference to the figures and specifically FIG. 5. In operation, any or all of the ignition coil, engine starter, fuel pump, throttle sensor and electronic control module designed in accordance with the present invention are installed in the vehicle 12 as would be performed with the conventional part as described in step S2.

The system is now installed in a vehicle 12 and is ready for use. The user 14 of the vehicle 12 will be equipped with the remote control unit 16 and may now use the vehicle 12. In order to enable the vehicle to start, the user must turn the transmission channel frequency selection dial 104 to tune the remote transmitter to the desired channel frequency for transmitting signals to the parts installed within the vehicle 12 as described in step S4. The disable system key 102 of the remote control unit 16 is then activated to close all switches thereby connecting each of the installed parts to its respective system or power supply as described in step S6. The user 14 may now enter the vehicle 12 and travel to their destination as stated in step S8.

Upon reaching the destination and exiting the vehicle 12 or realizing the vehicle 12 is being stolen, the user may activate the disable system key 102 on the remote control unit 16 causing a control signal to be transmitted to each of the parts installed in the vehicle 12 and including a receiver and receiver antenna combination tuned to the correct frequency to open the respective switches and prevent the vehicle from starting as stated in step S10.

Upon returning to the vehicle 12, the user may again deactivate the system by either pressing the disable system key 102 on the remote control 16 to wirelessly transmit a signal to the installed parts tuned to the set frequency or by transmitting a signal using a telephone to the additional wireless receiver connected to each installed part. This signal will act to close the effected switches connected to receivers tuned to the selected frequency thus allowing the parts to be connected to the vehicle battery and allow the vehicle to start as stated in step S12.

It is to be realized that any or all of the individual parts, i.e. ignition coil, starter, fuel pump, throttle position sensor and electrical control module designed in accordance with the present invention may be installed in a vehicle to prevent operation of the vehicle. These individual parts are designed to replace the identical parts existing in conventional vehicles and will be installed as would any conventional replacement parts. Alternatively, these parts may be installed in a vehicle as original parts. As these parts are designed to receive signals transmitted at a defined identical frequency only one remote control is needed for use with any or all of the parts.

From the above description it can be seen that the remote control vehicle disable system of the present invention is able to overcome the shortcomings of prior art devices by providing a remote control vehicle disable system which is able to prevent a vehicle from starting upon receipt of a control signal generated by a remote control unit. The remote control vehicle disable system includes a receiver and switch combination connected to and integral with any or all of the ignition coil, engine starter, fuel pump, throttle position sensor and electronics control module for remotely disabling the respective system to prevent a vehicle from starting and is able to be included in any of numerous different types of vehicles such as a truck, van, bus, motorcycle, moped, boat, airplane, etc. The remote control vehicle disable system also includes a remote control unit able to transmit signals to the installed parts at any of a plurality of user selected frequencies. Furthermore, the remote control vehicle disable system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A remote control vehicle disable system attached to a power source for remotely preventing starting of a vehicle, said remote control vehicle disable system comprising:
   a) a remote control unit and a plurality of control units positioned within the vehicle for receiving wirelessly transmitted control signals from said remote control unit, each control unit being receptive to a signal at a different predetermined frequency;
   b) said remote control unit including at least one key for generating a control signal and a transmitter for transmitting said control signal at one of the predetermined different frequencies to said vehicle upon activation of said one key;
   c) said control units each including a receiver tuned to receive signals at the predetermined frequency for the respective control unit and each control unit having a switch activated by its respective control unit connected to a different predetermined part of the vehicle and operable between a first closed position connecting the predetermined part to its respective system permitting the vehicle to start and a second open position disconnecting the predetermined part from its respective system preventing the vehicle from starting;
   d) one of said predetermined parts being a vehicle ignition and the corresponding control unit is integrally connected to said vehicle ignition;
   e) another of said predetermined parts being an engine starter and the corresponding control unit is integrally connected to said engine starter;

f) another of said predetermined parts being an electrical control module and the corresponding control unit is integrally connected to said electrical control module;

g) another of said predetermined parts being a fuel pump and the corresponding control unit is integrally connected to said fuel pump;

h) another of said predetermined parts being a throttle position sensor and the corresponding control unit is integrally connected to said throttle position sensor; and i) said remote control unit having a transmission channel selector for selecting a desired transmission channel frequency of the signal to be sent to said vehicle, said key initiating the sending of the signal at the channel frequency selected.

2. The remote control vehicle disable system as recited in claim 1, wherein said receivers wirelessly transmitted signals originating from a telephone.

* * * * *